2,836,600
Patented May 27, 1958

2,836,600

ALPHA-BROMO,BETA(5-NITRO-2-THIENYL)-ACROLEIN ISONICOTINYL HYDRAZONE

Gino Carrara and Emilio Testa, Milan, Italy, assignors to Lepetit S. p. A., Milan, Italy No Drawing. Application October 19, 1954
Serial No. 463,311

Claims priority, application Great Britain
October 30, 1953

1 Claim. (Cl. 260—294.8)

This invention relates to unsaturated nitro thiophene derivatives. More particularly, the invention relates to 5-nitro-2-thienyl acrolein derivatives having the formula

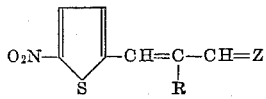

wherein R represents hydrogen or bromine and Z represents a bivalent radical of the class consisting of hydroxyimino, hydrazono, semicarbazono, thiosemicarbazono, and isonicotinylhydrazono.

In our copending application Serial No. 438,360, filed June 21, 1954, we describe and claim a method of preparing aldehydes corresponding to the general formula

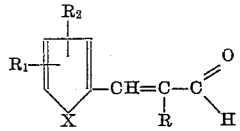

and their functional derivatives, wherein X represents sulfur, oxygen or a —CH=CH— group; R is halogen; $R_1$ and $R_2$ are the same or different and represent hydrogen, halogen, lower aliphatic alkyl or alkoxy radical or a nitro group.

We have now found that the compounds corresponding to the above formula, in which X is sulfur, $R_1$ is a 5-nitro group, R is hydrogen or bromine and $R_2$ is hydrogen, when condensed with a compound which is able to form the group —CH=N— with aldehydes, give a very interesting class of compounds.

All these compounds, which are now disclosed in the present specification, have been found to possess outstanding antibacterial activity, comparable with that of the commonly used natural antibiotics, for example of chloramphenicol.

Typical compounds of the present invention are, for instance, 1-[α-bromo-β-(5-nitro-2-thienyl)-acrylidene]-2-isonicotinyl-hydrazine, α-bromo-β-(5-nitro-2-thienyl)-acrolein hydrazone, α-bromo-β-(5-nitro-2-thienyl)-acrolein oxime, which have been found to exert marked antibacterial activity on many bacteria, such as *Micrococcus aureus*, *Proteus vulgaris*, *Streptococcus faecalis*, *Escherichia coli*, *Pseudomonas aeruginosa*, *Klebsiella pneumoniae*, and *Mycobacterium tuberculosis* H37Rv.

More particularly, 1-[α-bromo-β-(5-nitro-2-thienyl)-acrylidene]-2-isonicotinyl-hydrazine, which may also be defined as α-bromo-β-(5-nitro-2-thienyl)-acrolein isonicotinylhydrazone, has an antibacterial activity which is as high as that of chloramphenicol on *M. aureus*.

All these compounds are synthetized by methods which have been already described in the chemical literature, with adjustments of the technical procedure according to the individual cases. The following examples give a survey of said methods as applied to the preparation of the compounds of the present invention.

Example 1

A warm solution of 13 g. α-bromo-β-(5-nitro-2-thienyl)-acrolein in 350 ml. acetic acid is added to a solution of 3.2 g. 80% hydrazine in 150 ml. acetic acid. The mixture is heated for 10 minutes on a boiling water bath, then it is cooled in an ice bath; an orange precipitate forms, which is collected and dried. Yield 12 g. (87% of the theoretical amount) of α-bromo-β-(5-nitro-2-thienyl)-acrolein hydrazone having M. P. 232° C. of formula

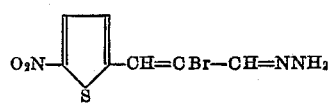

Example 2

A solution of 10 g. β-(5-nitro-2-thienyl)-acrolein in 500 ml. ethyl alcohol is added to a mixture of 5 g. semicarbazide hydrochloride, 3.7 g. sodium acetate and 100 ml. 50% ethyl alcohol. It is heated on a water bath for 45 minutes, then the solution is concentrated to one half of its volume. After cooling, the precipitated yellowish needles are collected and dried. Yield: 10 g. (78% of theoretical amount) of β-(5-nitro-2-thienyl)-acrolein semicarbazone having M. P. 215–217° C., of formula

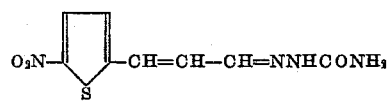

Example 3

A mixture of 10 g. α-bromo-β-(5-nitro-2-thienyl)-acrolein, 4.4 g. thiosemicarbazide and 150 ml. ethyl alcohol is refluxed for 2 hrs., then it is cooled in an ice bath after having decolorized with charcoal. A yellow precipitate forms, which is collected and dried. Yield: 11 g. (86% of theoretical amount) of α-bromo-β-(5-nitro-2-thienyl)-acrolein thiosemicarbazone having M. P. 227–228° C., of formula

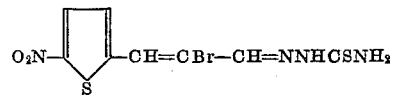

Example 4

To a warm solution of 10 g. α-bromo-β-(5-nitro-2-thienyl)-acrolein in 100 ml. dioxan, a filtered solution of 20 hydroxylamine, 40 g. sodium acetate, 50 ml. dioxane is added in one portion, and the mixture is allowed to stand at room temperature for 1 hr., then it is diluted with 100 ml. water. A yellow precipitate forms, which is collected and recrystallized from ethyl alcohol. Yield: 9 g. (85% of theoretical amount) of α-bromo-β-(5-nitro-2-thienyl)-acrolein oxime having M. P. 225–226° C., of formula

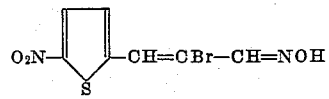

Example 5

A mixture of 13.5 g. isonicotinic acid hydrazide, 26.2 g. α-bromo-β-(5-nitro-2-thienyl)-acrolein, 200 ml. dioxane, 200 ml. ethyl alcohol is warmed to 50–60° C. for 30 minutes on a water bath. To the cooled solution are added 500 ml. water, whereby a yellowish precipitate forms, which is collected and recrystallized from a small amount of alcohol.

Yield: 32 g. (84% of theoretical amount) of α-bromo-β-(5-nitro-2-thienyl)-acrolein isonicotinylhydrazone of M. P. 216–217° C., having the formula

What we claim is:

α-Bromo-β-(5-nitro-2-thienyl)-acrolein isonicotinylhydrazone of the formula

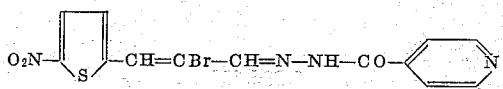

References Cited in the file of this patent

UNITED STATES PATENTS

| | | |
|---|---|---|
| 2,566,611 | Hartough | Sept. 4, 1951 |
| 2,649,461 | Hermann | Aug. 18, 1953 |

OTHER REFERENCES

Dann et al.: Chemische Berichte, vol. 82, pages 76–92 (1948).